United States Patent
Garland et al.

(10) Patent No.: US 7,070,194 B2
(45) Date of Patent: Jul. 4, 2006

(54) MEMORY FUNCTION FOR POWERED RUNNING BOARDS

(75) Inventors: Travis Garland, Dearborn, MI (US); Michael Ford, Troy, MI (US); Noel Ranka, Canton, MI (US); Scott Ford, Belleville, MI (US); Christina Bloxsom, Plymouth, MI (US); David Hsai, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 246 days.

(21) Appl. No.: 10/767,563

(22) Filed: Jan. 29, 2004

(65) Prior Publication Data

US 2005/0167941 A1    Aug. 4, 2005

(51) Int. Cl.
*B60R 3/02* (2006.01)
(52) U.S. Cl. .................................. 280/166; 280/163
(58) Field of Classification Search ............... 280/163, 280/166, 164.1; 182/127
See application file for complete search history.

(56) References Cited

U.S. PATENT DOCUMENTS

| | | | | |
|---|---|---|---|---|
| 3,403,926 A * | 10/1968 | Way et al. | ................... | 280/166 |
| 4,058,228 A | 11/1977 | Hall | ............... | 214/17 |
| 4,116,457 A * | 9/1978 | Nerem et al. | ............... | 280/166 |
| 4,249,634 A | 2/1981 | Potts | ............................. | 182/1 |
| 4,546,993 A | 10/1985 | Walker | ....................... | 280/291 |
| 5,085,450 A * | 2/1992 | DeHart, Sr. | ................. | 280/166 |
| 5,538,265 A * | 7/1996 | Chen et al. | ................. | 280/163 |
| 5,547,040 A * | 8/1996 | Hanser et al. | ............... | 182/88 |
| 5,601,300 A | 2/1997 | Fink | ........................... | 280/166 |
| 5,697,626 A | 12/1997 | McDaniel | ................... | 280/166 |
| 6,178,364 B1 | 1/2001 | Delurey | ...................... | 701/36 |
| 6,325,397 B1 | 12/2001 | Pascoe | ....................... | 280/166 |
| 6,375,207 B1 * | 4/2002 | Dean et al. | ................. | 280/166 |
| 6,641,158 B1 * | 11/2003 | Leitner | ...................... | 280/166 |
| 6,926,295 B1 * | 8/2005 | Berkebile et al. | .......... | 280/166 |
| 6,942,233 B1 * | 9/2005 | Leitner et al. | ............. | 280/166 |
| 2005/0258616 A1 * | 11/2005 | Scheuring et al. | .......... | 280/166 |

* cited by examiner

*Primary Examiner*—Jeff Restifo
(74) *Attorney, Agent, or Firm*—Gigette M. Bejin; Miller Law Group, PLLC

(57) ABSTRACT

A control mechanism for a powered running board on an automotive vehicle, such as a sport utility vehicle, utilizes the memory function of the vehicle to store therein established operating positions for the running board. The user or occupant of the vehicle can manually position the powered running board to a convenient operating position within a range of available operating positions on the vehicle. By storing the selected position of the running board in the memory function of the vehicle, the control mechanism can return to that same operating height each time the occupant seeks to use the running board for entry or exit of the vehicle. The control mechanism is operable with different configurations of running boards and with different power devices for effecting the movement of the running board.

18 Claims, 3 Drawing Sheets

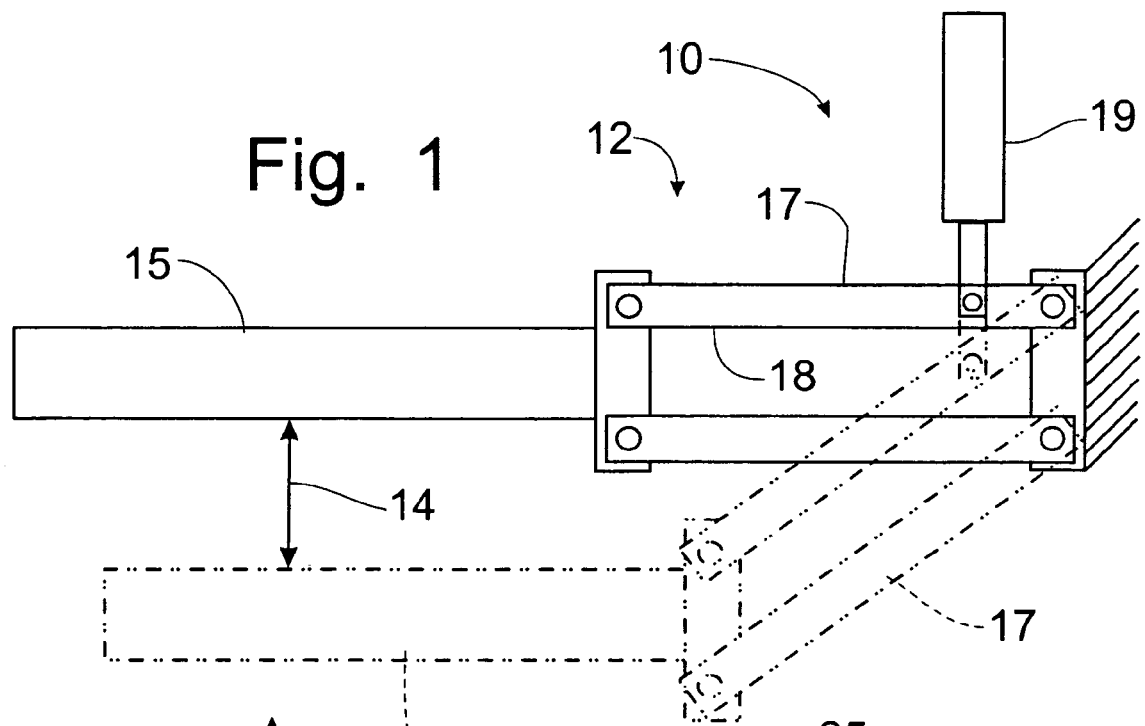
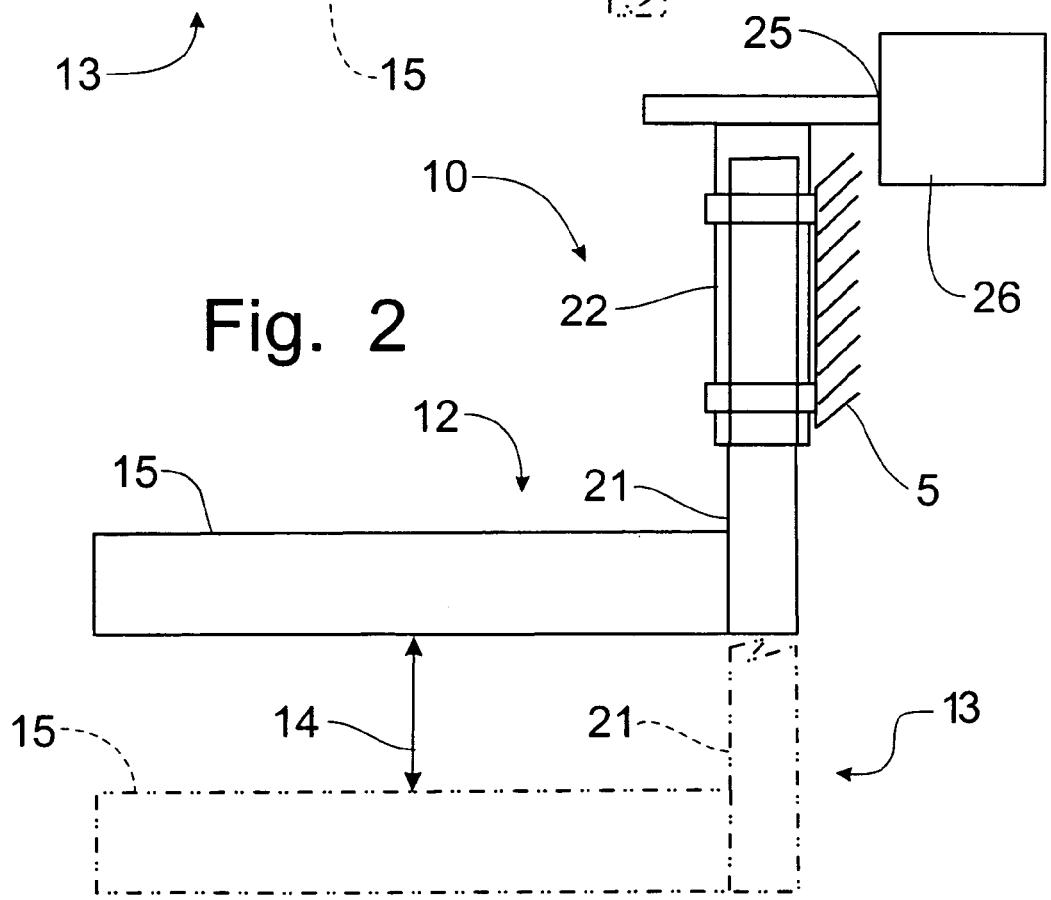

MEMORY FUNCTION FOR POWERED RUNNING BOARDS

BACKGROUND OF THE INVENTION

The popularity of sport utility vehicles and other four wheel drive vehicles has shown a substantial increase recently. Because of the high ground clearance for these four wheel drive vehicles, the floor of the vehicle is at a higher elevation above the ground than for two wheel drive sedans or other typical passenger vehicle. Accordingly, some people experience difficulty in gaining access to and egress from the high clearance four wheel drive vehicle.

Running boards have been used to provide assistance for entering and exiting four wheel drive, or other high ground clearance vehicles. Typically, running boards have a stationary step rigidly mounted to the frame of the vehicle to provide a step between the ground level and the floor level of the vehicle. However, appropriately positioning a stationary running board to provide a convenient step for the occupant of the vehicle will normally result in a reduced ground clearance for the vehicle; therefore, stationary steps are typically positioned at a location that is too high to be convenient for the occupant. Furthermore, stationary running boards can be considered a detriment to vehicle styling as the stationary running board typically increases vehicle width and provides only a small step for use by the occupant of the vehicle.

Movable running boards have been provided, such as is depicted in U.S. Pat. No. 5,697,626, issued to Patrick K. McDonald, et al on Dec. 16, 1997, in which the running board is pivotally supported on the frame of the vehicle and connected to a bell crank to pivotally move the step portion of a running board vertically between a raised retracted position and a lowered operating position. Powered movement of the running boards has also been provided, as is taught in U.S. Pat. No. 6,325,397, issued to David M. Pascoe, et al on Dec. 4, 2001. In this Pascoe patent, the running board is mounted on parallel linkages, which are coupled to an electric motor to effect a powered pivotal movement of the running board between a stored position and a deployed position. An electronic control unit is provided in the Pascoe patent to control the movement of the running board between the stored and deployed positions in conjunction with the opening of the vehicle door.

Another control device for retractable stairways on trucks and the like can be found in U.S. Pat. No. 6,178,364 issued to Paul J. Delurey, et al on Jan. 23, 2001. This Delurey control apparatus monitors one or more vehicle status conditions to require a pre-specified status before permitting an electric motor to move the powered retractable steps for a truck from a stowed position to a deployed position.

In U.S. Pat. No. 5,601,300 issued to Raymond W. Fink, et al on Feb. 11, 1997, a bracket assembly is provided to allow a vertical positioning of a mounted member, such as a step or a running board and a flexible mounting of the bracket to a variety of frame member sizes. The Fink patent does not depict a movable running board or a control apparatus for effecting movement thereof. U.S. Pat. No. 4,546,993, issued to George R. Walker on Oct. 15, 1985, provides for an adjustable motorcycle passenger floorboard member, which can be selectively manually positioned, but is not powered and no control apparatus is utilized for the positioning of the passenger floorboard.

A floating step assembly is shown in U.S. Pat. No. 4,249,634 issued to P. Keith Potts on Feb. 10, 1981, in which the step is vertically movable through a four bar linkage controlled by a mechanical locking mechanism to fix the floating step at a selected height. A retractable vehicle access stair and elevator is depicted in U.S. Pat. No. 4,058,228, issued to Edward L. Hall on Nov. 15, 1977, in which the stair apparatus is horizontally movable through the operation of a linear actuator and the elevator apparatus is vertically movable through a powered chain drive mechanism. The Hall apparatus does contemplate the use of an automatic sensing device to determine when the stair or elevator apparatus has reached a desired position.

People of different statures have different needs for the position of a running board to provide a convenient use of the running board for ingress and egress of the vehicle while permitting the running board to be stored in a retracted position that does not detract from the ground clearance of the vehicle. With power deployable running boards, no one position will allow most people to enter and exit the vehicle comfortably. Accordingly, it would be desirable to provide a control mechanism co-operable with the powered running board to provide the user with the ability to establish a preferred position of the running board at any selected point of travel permitted to the running board by the structure thereof, and to have this position stored in the memory of the control mechanism for retrieval at subsequent deployment events.

SUMMARY OF THE INVENTION

It is an object of this invention to overcome the aforementioned disadvantages of the known prior art by providing a control apparatus for a powered automotive running board incorporating a memory function to provide customized deployment.

It is another object of this invention to provide vehicle running board control mechanism that utilized the vehicle memory system to provide a customize operation of the powered running board.

It is a feature of this invention that the running board can be deployed to a different specified height for a selected group of individuals.

It is an advantage of this invention that the powered running board can be consistently deployed to a pre-selected height.

It is another advantage of this invention that the powered running board on an automotive vehicle can be deployed to a convenient operating height for different individuals.

It is still another advantage of this invention that the operator of the powered running board can establish a convenient operating height for the powered running board and store that position in the memory function of the control mechanism to permit a return to that convenient height whenever desired.

It is another feature of this invention that each person utilizing the powered running board can establish a pre-set operating height for consistent deployment.

It is yet another advantage of this invention that the right side running board can be operated independently of the left side running board.

It is still another feature of this invention that the control apparatus can be adapted to different styles or configurations of powered running boards.

It is a further object of this invention to provide a control mechanism for a powered running board on an automotive vehicle that is durable in construction, inexpensive of manufacture, carefree of maintenance, facile in assemblage, and simple and effective in use.

These and other objects, features and advantages are accomplished according to the instant invention by providing a control mechanism for a powered running board on an automotive vehicle, such as a sport utility vehicle. The control mechanism utilizes the memory function of the vehicle to store therein, established operating positions for the running board. The user or occupant of the vehicle can manually position the powered running board to a convenient operating position within a range of available operating positions on the vehicle. By storing the selected position of the running board in the memory function of the vehicle, the control mechanism can return to that same operating height each time the occupant seeks to use the running board for entry or exit of the vehicle. The control mechanism is operable with different configurations of running boards and with different power devices for effecting the movement of the running board.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a schematic elevational view of a first embodiment of a powered running board for use on automotive vehicles, the lowered operating position of the running board and associated linkage being shown in phantom;

FIG. 2 is a schematic elevational view of a second embodiment of a powered running board for use on automotive vehicles depicting the range of movement available to such running board configurations, the lowered operating position being shown in phantom;

DETAILED DESCRIPTION OF THE PREFERRED EMBODIMENT

Figure 3:
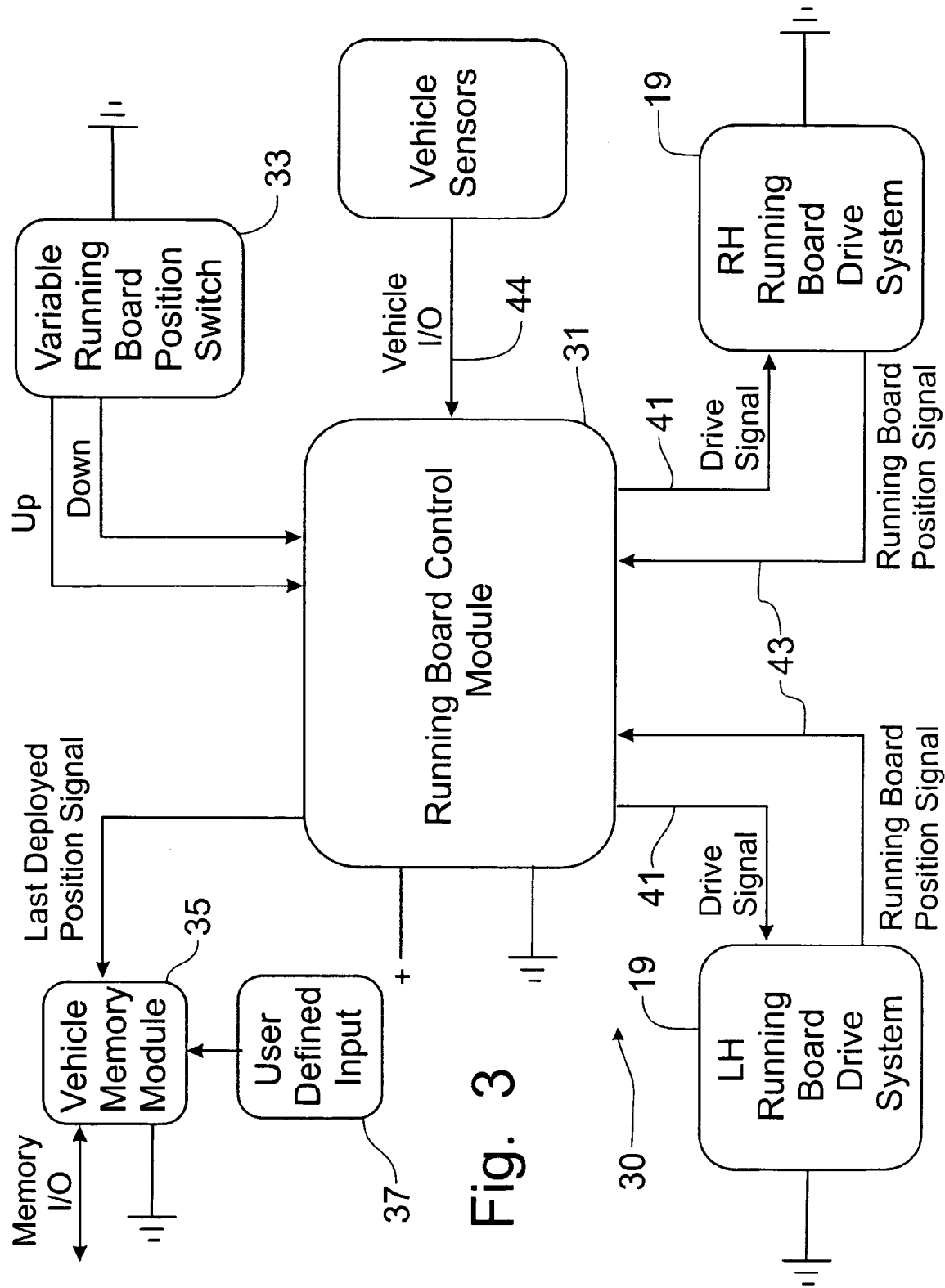
FIG. 3 is a schematic representation of the control mechanism for use with automotive powered running boards.

Referring to FIGS. 1–3, a control mechanism for a powered running board on an automotive vehicle incorporating the principles of the instant invention can be seen. The powered running board 10 can be manufactured in a number of different configurations. One representative configuration for the powered running board apparatus 10 is shown in FIG. 1. This configuration of running board is pivotally movable between a raised stored position 12 (shown in solid lines) and a lowered operating position 13 (shown in phantom), thus defining a range of operating movement 14 therebetween. The running board 15 is connected to a pivot mechanism 17, shown in FIG. 1 as a four bar linkage 18, to pivotally support the running board 15 throughout the range of movement 14. An actuator 19 powers the pivotal movement of the four bar linkage 18, and is typically a linear actuator 19, or an electric motor configured to convert rotary motion of the motor into linear movement of the four bar linkage 18. The four bar linkage 18 keeps the tread or step surface of the running board 15 level throughout the range of operation.

Referring now to FIG. 2, a different embodiment of a powered running board is depicted. In this configuration, the running board 15 is supported on threaded upright members 21 that are received within corresponding threaded receivers 22. An actuator 25, typically in the form of an electric motor 26, rotates the threaded receiver to transmit translational movement of the threaded upright member 21, thus raising and lowering the running board 15 between the raised stored position 12 (shown in solid lines) and the lowered operating position 13 (shown in phantom lines), defining the range of operating movement 14 therebetween. As one of ordinary skill in the art will recognize, the threaded receivers 22 must be rotationally supported on the frame 5 of the automotive vehicle by bearings or the like (not shown) and coupled to the actuator 25. To effect parallel movement of the running board 15, all of the threaded receivers 22 will simultaneously rotated to cause translational movement of the corresponding upright members 21.

The use of an electric motor 26 for the actuator 19, 25 provides the ability to have significant control of the operation of the powered running board 15. Electronic sensors can sense the position or the extent of rotation of the electric motor 26 and, thus, provide consistent repeatability of the position of the electric motor 26 whenever the actuator 19, 25 is engaged. Accordingly, the vertical position of the running board 15 within the operating range 14 can be repeated with great accuracy, irrespective of the configuration of the apparatus permitting vertical movement of the running board 15.

Referring now to FIG. 3, a schematic diagram of the control system 30 incorporating the principles of the instant invention can best be seen. The control system 30 includes a central control module 31 operable to receive and transmit signals to the other components of the system 30. The control module 31 is electrically connected to the drive mechanism 19, 25, 26 for each of the left and right side running boards 15 independently to permit individual operation thereof. The control module 31 is also electrically connected to a position switch mechanism 33 that is used to manually operate each of the left and right side motors 26 for the corresponding running boards 15. The switch mechanism 33 can include individual switches for the left and right side operation or a single switch with a cooperative left/right operational switch. Typically, this switch mechanism 33 will include a toggle switch or the equivalent to permit use thereof in the up and down directions.

The control module 30 is also connected to a memory module 35 which can be a part of the existing memory module (not shown) in modern automotive vehicle to control positions of mirrors and seats, or the memory module 35 can be a separate memory bank that is incorporated into the control module 31. Ancillary to the memory module 35 can be an optional selector switch 37 that is operative to store in the memory module 35 selected positions for multiple users or other pre-set positions that can be stored in the memory module 35.

During operation, the control module 30 can provide a drive signal 41 to each respective left and right drive motor 26 to effect operation thereof to move the corresponding running board 15 in the desired direction. Each drive motor 26 is also operative to provide a feedback signal 43 to the control module 31 to indicate the rotated position of the drive motor 26 being operated, and consequently, the operating position (vertical height) of the corresponding running board 15.

The control module 31 is also operable to receive input signals from various components of the vehicle to indicate status of the component to provide an operative interlock system through the control module 31. For example, the opening of a door (not shown) can initiate power to the drive motor 26 for the corresponding running board 10. A sensor can provide an input signal 44 to the control module 31 to be indicative of whether the vehicle is moving or if the transmission is in a predetermined position, thus controlling the transmission of the drive signal 41.

Figure 4:
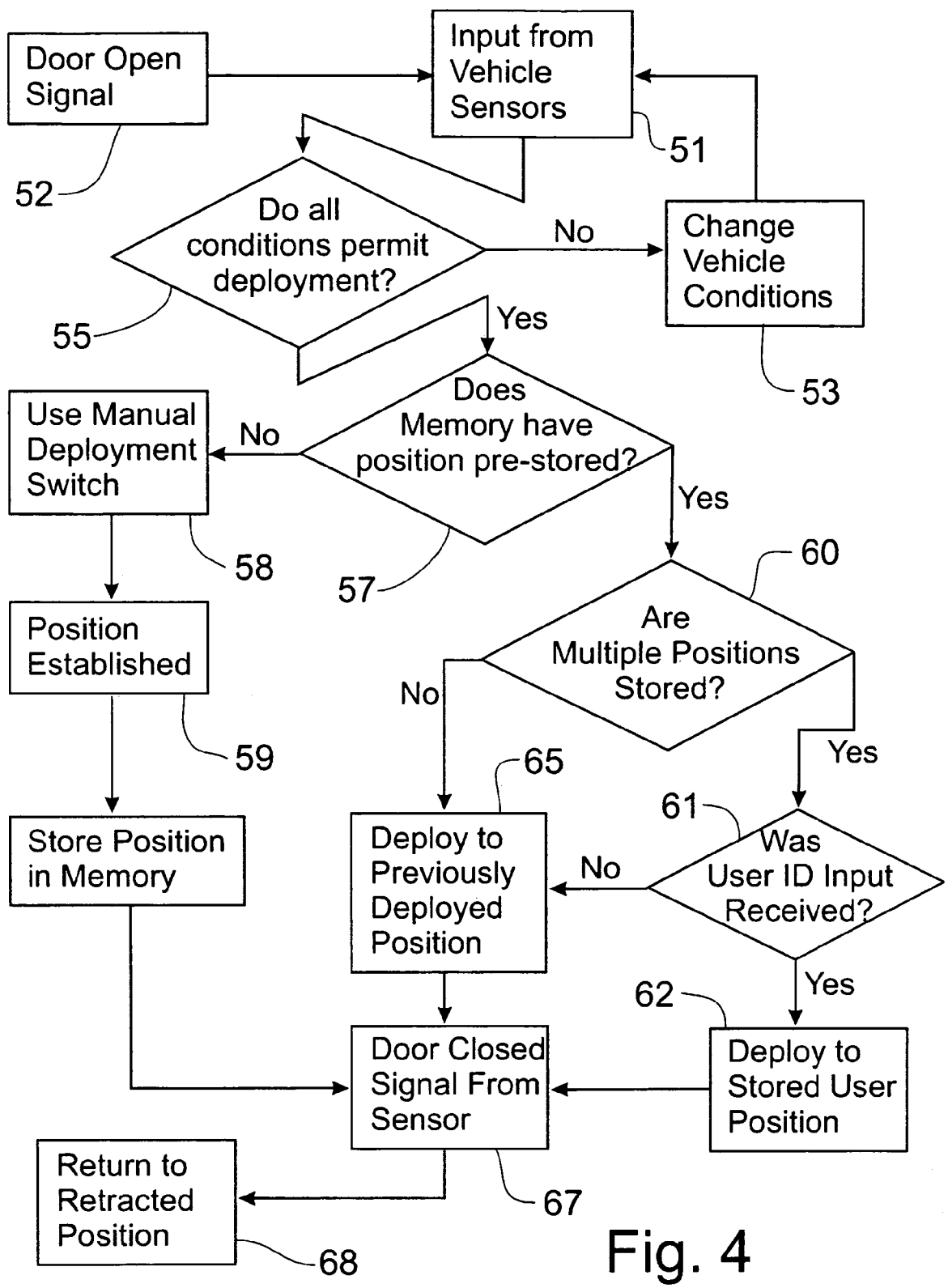
FIG. 4 is a logic flow diagram for the process of controlling a powered running board.

In operation, as reflected in the logic flow diagram of FIG. 4, the input signal from one or more vehicle sensors at step 51, such as the signaling of the opening of a vehicle door at step 52, initiates the query as to whether all conditions permit the deployment of the running boards at step 55. For example, the opening of the door at step 52 would normally initiate the deployment of the running board 10 on the corresponding side of the vehicle; however, should another sensor indicate that the vehicle is moving, deployment of the running board 10 should not be started. Accordingly, if all of the sensed vehicle conditions at step 55 indicates that deployment should not occur, then changing vehicle conditions at step 53 would be repeated until all the preselected sensor criteria is met. At step 57, the subsequent query is whether a memory position has already been stored in memory. If not, the running board 10 would have to be manually deployed through the switch 33 at step 58 until a desired position is established and that position is then automatically stored in the memory module 35 at step 59.

If the memory module 35 already has a position stored, the next query at step 60 is whether multiple positions are stored. If so, user identification needs to be inputted prior to step 61 and deployment of the running board 10 is then accomplished at step 62 according to the position selected from the memory module 35. If multiple positions are not stored in the memory module 35, the running board 10 is deployed to the last stored position at step 65. Once the vehicle door is closed at step 67, the running board 10 is then returned to the retracted position 12 at step 68.

The control system 30 will also be operative to deploy the running board to the last deployed position when the vehicle door is opened from the outside, assuming that all other conditions at step 51 are satisfied. Assuming that the vehicle is parked and is not being operated, the driver would approach the vehicle and open the door in a normal manner. The process would go through the steps from step 52 with the sensor indicating the opening of the vehicle door. Since the vehicle is parked and not operating, all of the other preselected conditions should be satisfied at steps 51 and 55. Assuming further that the vehicle had been previously operated or otherwise has a pre-stored position of deployment in the memory module 35, the query at step 57 is positively answered. At step 60, no user identification would have been provided so the running board 10 would then be deployed to the previously deployed position at step 65.

One skilled in the art will realize that the memory module 35 could also be used to store pre-set deployment positions, such as 50% or 100% of the movement range 14, being used in deployment of the running board 10. Such pre-established deployment positions could be used in lieu of the user defined positions inputted by the control 37 and the process at step 61. The last stored position will be saved in the memory module 35 until a new position is stored therein. Accordingly, once the position of the running board 15 is stored in the memory module 35, the control module 31 will send a drive signal 41, when properly initiated, until the feedback signal 43 indicative of the return of the running board 15 to the pre-selected position has been obtained from the corresponding drive motor 26.

With the utilization of the proper vehicle input signals 44, the control module 31 can be operative to return the running board 15 to the raised stored position 12 whenever the door (not shown) is closed and automatically back to the last selected stored operative position whenever the door is opened.

One skilled in the art will recognize that this control system 30 can be utilized to operate the running boards 15 on both sides of the vehicle or, alternatively, on just the driver's side of the vehicle with the passenger side being a conventional mechanical or normal powered movable running board 15. The position switches 33, 37 can be appropriately positioned for access by the proper occupant of the vehicle.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A control system for operating a powered running board movably mounted on an automotive vehicle for deployment between a retracted position and an operative position, comprising:
   a control module in operative communication with a drive mechanism for powering the movement of said running board, said control module being operative to send a drive signal to said drive mechanism to effect operation of said drive mechanism to cause movement of said running board, said control module further being operative to receive a position signal from said drive mechanism indicative of the deployment position of said running board;
   a memory module operatively connected to said control module to store a previously defined deployment position, said control module being operable to stop the operation of said drive mechanism when said position signal is indicative of said running board being moved to said previously defined deployment position; and
   a position switch for manually moving said running board to a desired position, said control module storing said desired position in said memory module for subsequent deployment as said previously defined deployment position.

2. The control system of claim 1 wherein said control module is operatively connected to sensors on said automotive vehicle for sensing predetermined conditions of said vehicle pertinent to the deployment of said running board, said sensors providing input signals to said control module.

3. The control system of claim 2 wherein said control module requires predetermined input signals before sending said drive signal to said drive mechanism.

4. The control system of claim 3 wherein said input signals includes a signal indicative of a vehicle door corresponding to said running board being opened.

5. The control system of claim 4 wherein said memory module is operable to store multiple deployment positions, each said deployment position being independently selectable through a user defined input control.

6. The control system of claim 5 wherein said multiple deployment positions correspond to pre-programmed deployment positions for said running board.

7. The control system of claim 5 wherein said multiple deployment positions are independently defined through use of said position switch.

8. The control system of claim 5 wherein one of said running boards is positioned on each opposing transverse side of said automotive vehicle.

9. A method of controlling the deployment of a running board movably mounted on an automotive vehicle for movement between a retracted position and an operative position comprising the steps of:
- receiving input signals from vehicles sensors indicative of pre-selected vehicle conditions in a control module;
- if all vehicle conditions permit deployment of said running board, retrieving from a memory module a stored deployment position defining a desired said operative position, said stored deployed position being defined by manually moving said running board into said desired operative position;
- sending a drive signal from said control module to a drive mechanism operably powering the movement of said running board;
- obtaining from said drive mechanism into said control module a feedback signal indicative of a present deployed position of said running board; and
- stopping said drive mechanism when said feedback signal indicates said present deployed position is the same as said stored deployment position.

10. The method of claim 9 wherein one of said input signals includes a signal indicating a vehicle door corresponding to said running board is opened.

11. The method of claim 10 further comprising the step of:
- returning said running board to said refracted position when said vehicle door sensor indicates said door is closed.

12. The method of claim 11 wherein said stored deployment position is the previously deployed position of said running board.

13. The method of claim 11 wherein said manually defined stored deployment position is established by manually manipulating a position switch operatively connected to said control module.

14. In an automotive vehicle including a vehicle frame having mounted thereon a running board movable between a retracted position and an operative position, the improvement comprising:
- a control system controlling the movement of said running board to position said running board at a predetermined deployed position when a vehicle door corresponding to said running board is opened, said control system including:
  - a control module in operative communication with a drive mechanism for powering the movement of said running board, said control module being operative to send a drive signal to said drive mechanism to effect operation of said drive mechanism to cause movement of said running board, said control module further being operative to receive a position signal from said drive mechanism indicative of the deployment position of said running board; and
  - a memory module operatively connected to said control module to store a previously defined deployment position, said control module being operable to stop the operation of said drive mechanism when said position signal is indicative of said running board being moved to said previously defined deployment position, said previously defined deployment position being established manually before being stored in said memory module.

15. The automotive vehicle of claim 14 wherein said control system further comprises:
- a position switch for manually moving said running board to a desired position to establish said previously defined deployment position, said control module storing said desired position in said memory module for subsequent deployment as said previously defined deployment position.

16. The automotive vehicle of claim 15 wherein said control module is operatively connected to sensors on said automotive vehicle for sensing predetermined conditions of said vehicle pertinent to the deployment of said running board, said sensors providing input signals to said control module, one of said input signals being indicative of said vehicle door being opened.

17. The automotive vehicle of claim 16 wherein said control module requires predetermined input signals before sending said drive signal to said drive mechanism.

18. The automotive vehicle of claim 17 wherein said memory module is operable to store multiple deployment positions, each said deployment position being independently selectable through a user defined input control.

* * * * *